(12) United States Patent
Aleksov et al.

(10) Patent No.: US 9,323,327 B2
(45) Date of Patent: Apr. 26, 2016

(54) SYSTEM AND METHOD FOR PROVIDING TACTILE FEEDBACK

(71) Applicant: Intel Corporation, Santa Clara, CA (US)

(72) Inventors: Aleksandar Aleksov, Chandler, AZ (US); Ravindranath V. Mahajan, Chandler, AZ (US); Brian S. Doyle, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 13/726,078

(22) Filed: Dec. 22, 2012

(65) Prior Publication Data
US 2014/0176452 A1 Jun. 26, 2014

(51) Int. Cl.
*G06F 3/01* (2006.01)
*G06F 3/041* (2006.01)
*G06F 3/0481* (2013.01)

(52) U.S. Cl.
CPC .............. *G06F 3/016* (2013.01); *G06F 3/0412* (2013.01); *G06F 3/04812* (2013.01)

(58) Field of Classification Search
CPC .... G06F 3/0412; G06F 3/016; G06F 3/04812
USPC .................................................. 345/156–184
See application file for complete search history.

(56) References Cited

U.S. PATENT DOCUMENTS

| | | | | |
|---|---|---|---|---|
| 6,115,482 A * | 9/2000 | Sears | ................... | G09B 21/006 348/62 |
| 8,368,641 B2 * | 2/2013 | Tremblay | ................ | G06F 3/011 345/156 |
| 2005/0052412 A1 * | 3/2005 | McRae | ................... | A63F 13/06 345/158 |
| 2005/0285844 A1 * | 12/2005 | Morita | ................... | A61B 6/466 345/156 |
| 2005/0285853 A1 * | 12/2005 | Morita | ................ | G06F 3/04815 345/419 |
| 2005/0285854 A1 * | 12/2005 | Morita | ................... | G06F 3/016 345/419 |
| 2005/0289472 A1 * | 12/2005 | Morita | ................... | G06F 3/011 715/757 |
| 2006/0134586 A1 * | 6/2006 | Armingaud | .......... | G09B 21/003 434/113 |
| 2008/0050711 A1 * | 2/2008 | Doswell et al. | ............... | 434/350 |
| 2009/0011390 A1 * | 1/2009 | Abernethy, Jr. | ...... | G09B 21/003 434/114 |
| 2009/0167704 A1 * | 7/2009 | Terlizzi et al. | ................ | 345/173 |
| 2011/0234502 A1 * | 9/2011 | Yun et al. | ...................... | 345/173 |
| 2012/0068967 A1 * | 3/2012 | Toubiana | ................ | G06F 3/014 345/174 |
| 2012/0242592 A1 * | 9/2012 | Rothkopf et al. | ............. | 345/173 |
| 2012/0286944 A1 * | 11/2012 | Forutanpour et al. | ...... | 340/407.1 |
| 2013/0093829 A1 * | 4/2013 | Rosenblatt et al. | ........ | 348/14.01 |

* cited by examiner

*Primary Examiner* — Dmitriy Bolotin

(74) *Attorney, Agent, or Firm* — Grossman, Tucker, Perreault & Pfleger, PLLC

(57) ABSTRACT

A system and method for providing tactile feedback in a user interface. The system includes a tactile feedback assembly configured to communicate with a user interface of an electronic device. The tactile feedback assembly is configured to provide mechanical and/or nerve stimulation to a user during user interaction (e.g. navigation, input of data, etc.) of the user interface. The mechanical and/or nerve stimulation is configured to provide a user with tactile sensation (in the form of the sense of touch) in response to user interaction with the user interface, including, but not limited to, sense of texture and sense of pressure.

20 Claims, 6 Drawing Sheets

SYSTEM AND METHOD FOR PROVIDING TACTILE FEEDBACK

FIELD

The present disclosure relates to human-machine interaction, and, more particularly, to a system and method for providing tactile feedback in a user interface of electronic devices.

BACKGROUND

With ongoing advances in technology, the field of human-machine interaction has grown rapidly, particularly with regard to personal electronic devices. In particular, many personal devices, such as smartphones, tablets, personal navigation systems, gaming devices, and the like are now equipped with touch-sensitive displays (e.g. touchscreens). A touchscreen may generally provide a flat and smooth surface allowing direct user interaction with the device, allowing a user to input commands and data directly on the display without requiring any additional peripheral inputs (e.g. keyboard or mouse), thereby requiring fewer accessories.

The popularity of personal devices (e.g. smartphones and tablets) is driving the demand and acceptance of touch-sensitive displays in a variety of electronics. In additional to personal electronic devices, touchscreens have also become relatively popular in other fields, including devices related to the medical field, heavy industry, as well as kiosks, such as museum displays or room automation, where traditional inputs (e.g. keyboard and mouse systems) do not necessarily allow an intuitive, rapid and/or simplified user interface.

While touchscreens may generally provide a versatile user experience, they have some drawbacks. For example, unlike a dedicated input device such as a keypad with discrete well-defined keys, touchscreens are generally flat, and, as a result, do not provide tactile guidance for a user when interacting with and inputting data on the touchscreen interface. Rather, a user generally relies on visual guidance when interacting with and inputting data on the touchscreen. Hence, a serious drawback of touchscreens is the inherent difficulty for a user to input data accurately because adjacent inputs (e.g. buttons) may be indistinguishable from one another, particularly by feel. For example, it may be common to incorrectly enter key strokes on touchscreens and, as such, the user is generally required to maintain eye contact on the display to ensure data input is accurate.

Some devices provide tactile guidance to users, but in limited form. For example, some devices include stimulation in the form of vibrations in response to a user touching the screen and inputting data or making a selection on the touchscreen. Alternatively, or in addition to, feedback via a vibrational response, some devices may provide an audible response, such as a clicking sound, in response to user input. However, stimulation in the form of vibration and/or audible cues to alert the user of input on the touchscreen do not necessarily mitigate the lack of tactile guidance in touchscreens. The lack of tactile guidance may be especially critical in certain settings where potentially dangerous machines and parts are in constant motion, such as when attempting to interact with the touchscreen while operating the controls of a moving vehicle (e.g. making a cellular telephone call while driving). In these instances, the user may still be required to maintain eye contact with the touchscreen to ensure accurate interaction and navigation of the user interface, which may redirect the user's focus away from the task at hand (e.g. driving), and ultimately increase the risk of injury.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to a system and method for providing tactile feedback in a user interface. The system may include tactile feedback assembly configured to communicate with a user interface of an electronic device. The tactile feedback assembly is configured to provide mechanical and/or nerve stimulation to a user during user interaction (e.g. navigation, input of data, etc.) of the user interface. The mechanical and/or nerve stimulation is configured to provide a user with tactile sensation (in the form of the sense of touch) in response to user interaction with the user interface.

In one embodiment described herein, the tactile feedback assembly is configured to be physically integrated with a touchscreen display of an electronic device, such that the tactile feedback assembly provides tactile sensation to the user's fingertips, for example, in response to user interaction (e.g. touch) with the touchscreen display. In another embodiment, the tactile feedback assembly is configured to be a physically separate component from an electronic device and may be fitted within an article of clothing to be worn by a user, such as a glove. The glove may further include circuitry configured to allow wireless communication with a remote electronic device enabled to communicate with the tactile feedback assembly. The user may interact with a user interface of the electronic device via the tactile feedback assembly of the glove, wherein the tactile feedback assembly may be configured to receive signals related to user input and generate mechanical and/or nerve stimulation in response thereto upon one or more surfaces of the user's hand, including their fingers and/or palm.

The mechanical and/or nerve stimulation generated by the tactile feedback assembly may be configured to provide enhanced tactile sensation, including, but not limited to, sense of pressure (e.g. downward motion, such as striking a conventional keyboard) and/or sense of texture (e.g. distinguish between soft and hard or smooth and rough textures).

Accordingly, a system and method consistent with the present disclosure improves human-machine interaction by providing enhanced feedback of a user interface. More specifically, the system provides an improved means of tactile feedback by way of mechanical and/or nerve stimulation to produce tactile sensation, thereby providing users with a sense of touch when interacting with user interfaces. A system and method consistent with the present disclosure may therefore provide a more versatile user experience by providing a sense of touch, in addition to vibrational and audible response, during interaction with a user interface. A system and method consistent with the present disclosure also provides certain users, such as the visually impaired, an improved means of interacting with touchscreen devices that were not previously available.

Figure 1:
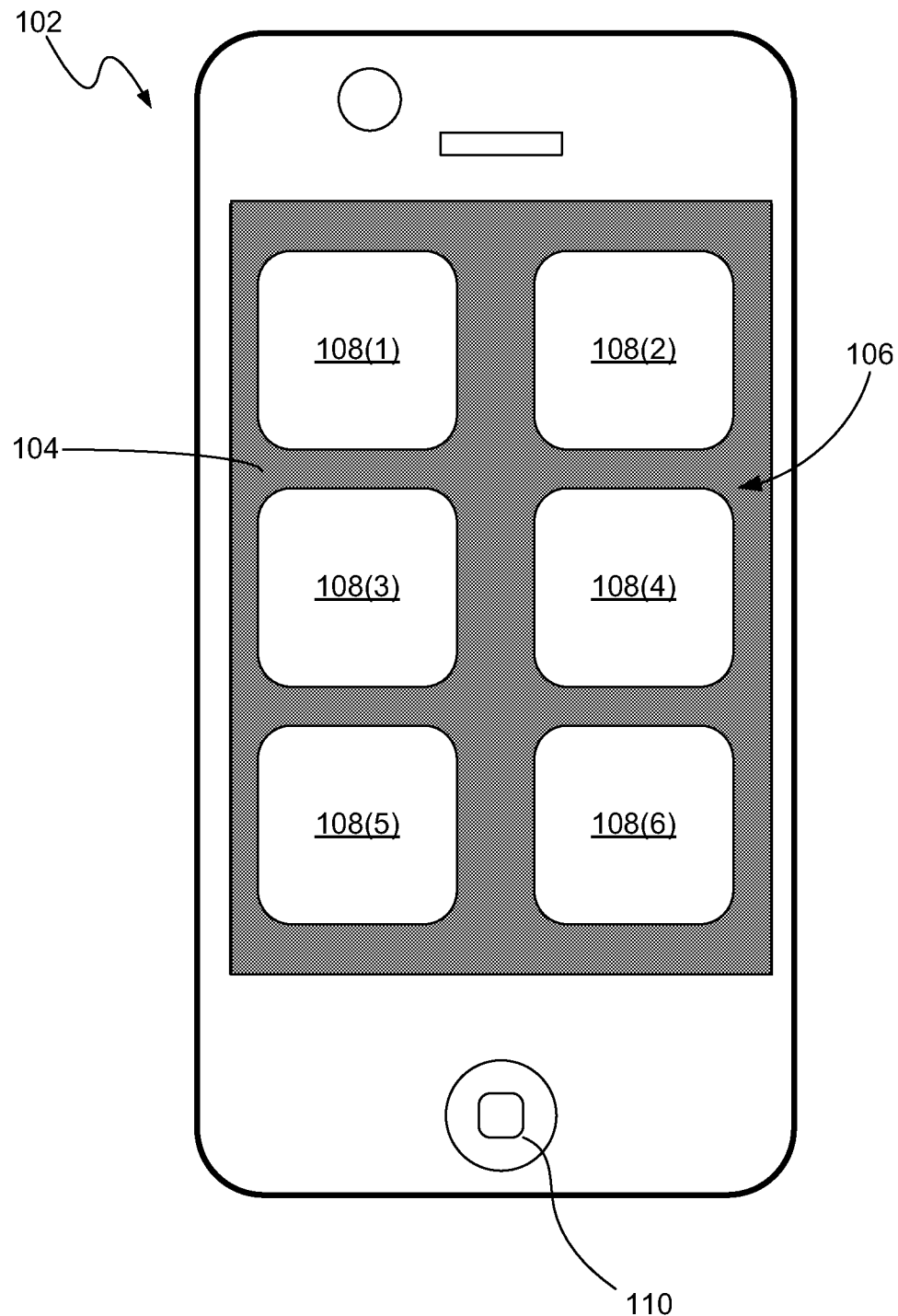
FIG. 1 illustrates an example electronic device having a touchscreen display for use with a system for providing tactile feedback consistent with various embodiments of the present disclosure.

Turning to FIG. 1, a system 100 consistent with the present disclosure is illustrated. As shown, the system 100 includes an electronic device 102 configured to provide digital media services and/or telephony services to a user. For example, the electronic device 102 may include, but is not limited to, a personal computer (PC) (e.g. desktop or notebook computer), a television, video monitor, electronic billboard, tablet computer, smart phone (e.g., iPhones®, Android®-based phones, Blackberries®, Symbian®-based phones, Palm®-based phones, etc.), portable video game device, portable digital assistant (PDA), portable media player (PMP), e-book, and other computing device.

In the illustrated embodiment, the electronic device 102 is an exemplary smartphone, and in particular, an Apple® iPhone® available by Apple Inc., of Cupertino, Calif. As shown, the electronic device 102 includes a display 104, which may be configured to provide visual display of an image or series of images associated with an executed application on the device 102, including, for example, pictures, a music video, movie, video clip, video game, streamed media content, etc. As generally understood, device 102 may include multiple forms of user input configured to allow a user to input spatial data to control operations of the device 102. For example, the display 104 may be a touch-sensitive display (e.g. touchscreen) configured to allow a user to control (i.e. navigate) a graphical user interface (GUI) 106 of the device 102 presented on the display 104. In addition to a touchscreen display 104, the device 102 may include other forms of user input (e.g. buttons 110, knobs, trackball, etc.) separate from the display 104 allowing the user to navigate the GUI 106.

As shown, the GUI 106 is configured to provide visual indication to the user of one or more selection inputs 108(1)-108(n) and allow the user to input spatial data to control operations of the device 102, including controlling operations and/or parameters of one or more running applications. As generally understood, the touchscreen display 104 may be configured to allow the user to navigate the GUI 106 and further generate user input based on detecting the presence and location of a user's touch (usually by one or more fingers) within an area of the display 104 corresponding to the selection inputs 108(1)-108(n) of the GUI 106.

As generally understood, each selection input 108 may correspond to a particular operation, such as, for example, execution of an application, control of a parameter of a currently running application, etc. For example, the selection inputs 108(1)-108(n) may correspond to applications available for execution on the device 102, which may include, for example, a telephone application, a video conferencing application, an e-mail application, an instant messaging application, a blogging application, a digital camera application, a digital video camera application, a web browsing application, a digital music player application and a digital video player application. The selection inputs 108(1)-108(n) may also correspond to options associated with a currently running application, such as, for example, during an active phone call, the option to place callers on hold 108(1), place the call on speakerphone 108(2), conference callers together 108(3), mute 108(4), end the call 108(5), etc.

As described in greater detail herein, the system 100 further include a tactile feedback assembly 112 (shown in FIGS. 2A-2C) configured to provide mechanical and/or nerve stimulation to a user during user interaction (e.g. navigation, input of data, etc.) with the GUI 106 presented on the display 104. The mechanical and/or nerve stimulation is configured to provide a user with tactile sensation (in the form of the sense of touch) in response to user interaction with the GUI 106. Herein, the term "tactile sensation" may refer to either a single force or a sequence of forces provided by the tactile feedback assembly 112 which provide a sensation to the user, particularly the user's fingertips. For example, vibrations, a single electrical jolt and a texture sensation may all be considered tactile sensations.

Figure 2A:
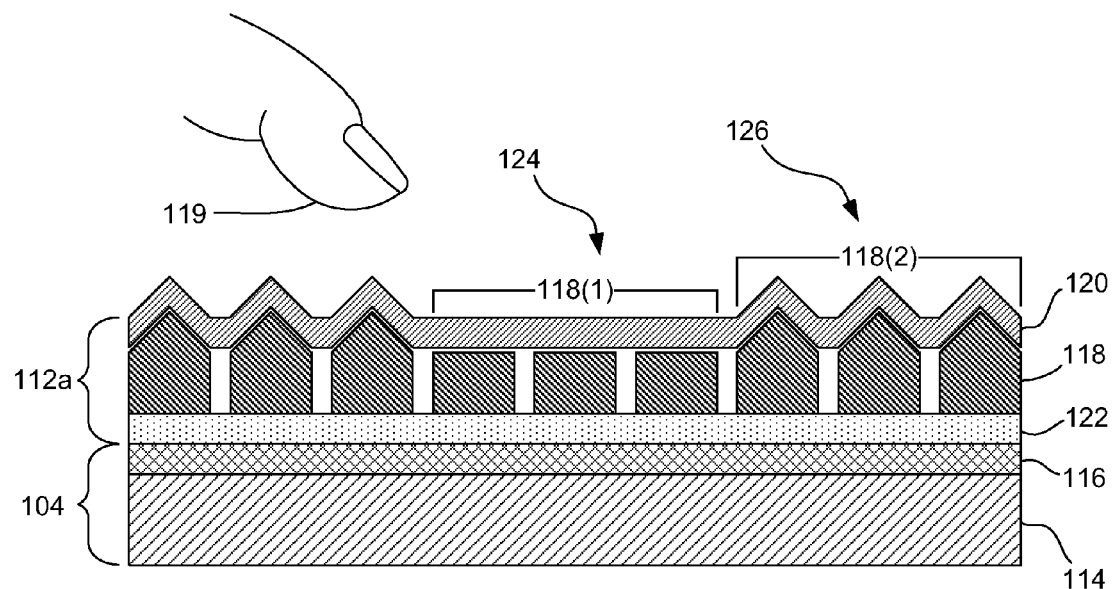
FIGS. 2A-2C illustrate enlarged cross-sectional views of the touchscreen display of the device of FIG. 1 integrated with different embodiments of a tactile feedback assembly consistent with the present disclosure.
Figure 2B:
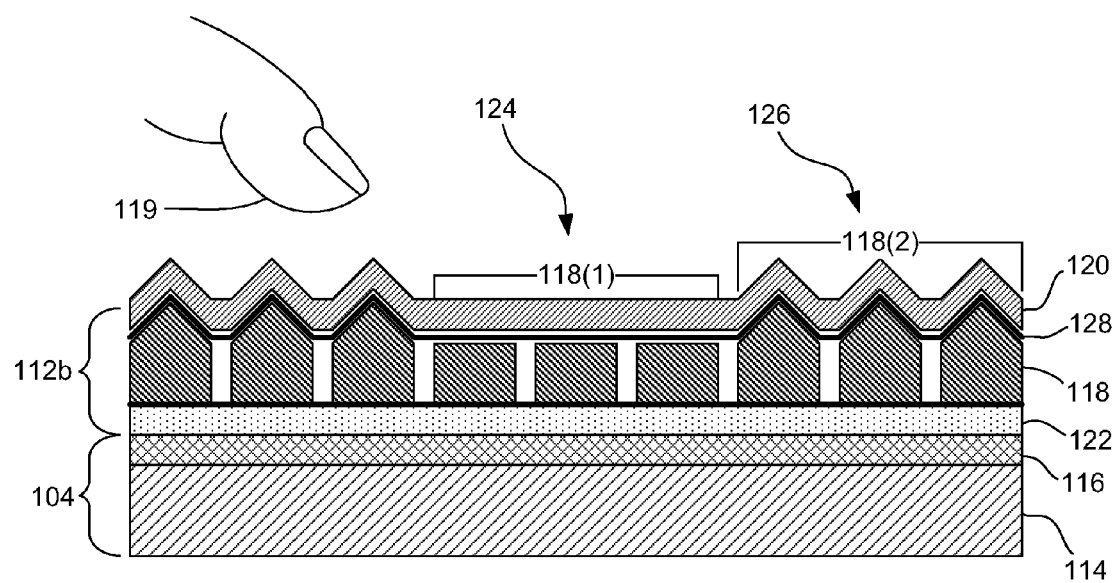
Figure 2C:
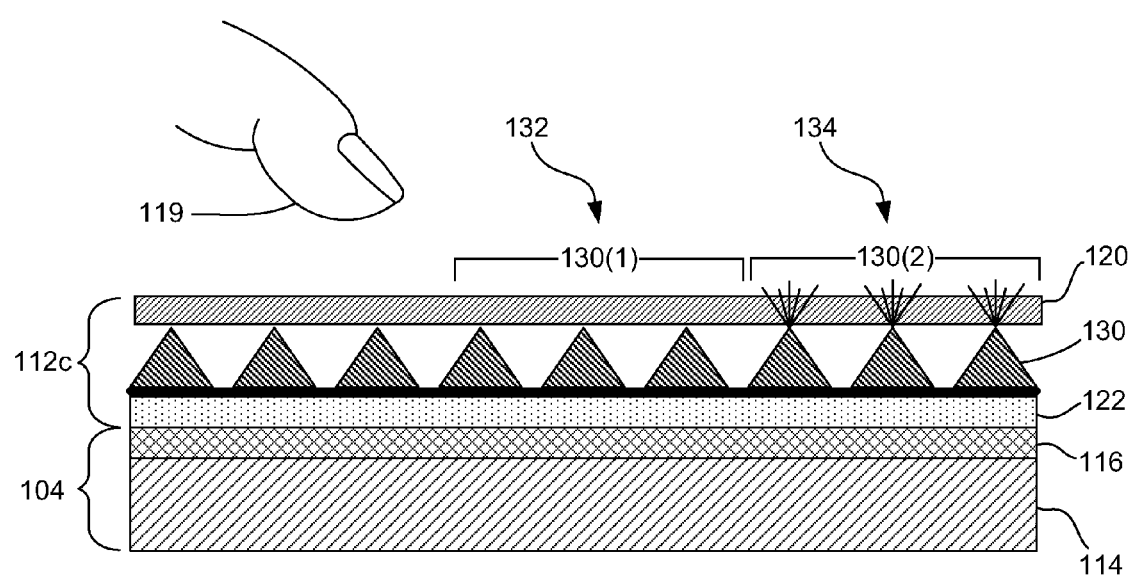

FIGS. 2A-2C generally illustrate enlarged cross-sectional views of the touchscreen display 104 of the device 102 of FIG. 1 integrated with different embodiments of a tactile feedback assembly 112a-112c consistent with the present disclosure. As shown in FIGS. 2A-2C, the tactile feedback assembly 112a-112c is shown covering the touchscreen display 104. The tactile feedback assembly 112a-112c may be configured to allow any user touch to be transmitted from the assembly 112a-112c to the touchscreen display 104 with little or no interference with the touch detection process of the touchscreen display 104. However, it should be understood that in other embodiments, the tactile feedback assembly 112a-112c may be arranged in different configuration, such as, for example, the tactile feedback assembly 112a-112c may be positioned underneath the touchscreen display 104 or may be entirely integrated and combined with the touchscreen display 104.

As shown, the touchscreen display 104 may include a display screen 114 and a touch sensing layer 116 including any custom, proprietary, known and/or after-developed touch sensing technology, including, but not limited to, resistive and capacitive technologies. The touch sensing layer 116 may be configured to sense the presence and location of a user's touch upon the touchscreen display 104, which may then used to generate touch input data corresponding to a user's selection of one or more selection inputs (e.g. 108(1)-108(n)) provided by the GUI 106. As generally understood, the device 102 may include circuitry including custom, proprietary, known and/or after-developed touch detection code (or instruction sets) that are generally well-defined and operable to receive touch data from the touch sensing layer 114 and identify a touch event and generate touch input data to control operations of the device 102.

Referring to FIGS. 2A and 2B, the tactile feedback assembly 112a-112b may include one or more feedback elements 118 configured to provide tactile sensation to a user, particularly a user's fingertips 119, during user interaction with the touchscreen display 104. The feedback assembly 1121-112b may further include a surface layer 120 positioned over the feedback elements 118, upon which the user may contact when interacting with the GUI 106 of the touchscreen display 104. The feedback assembly 112a-112b may further include a substrate layer 122 that may act as an insulator, for example, between the feedback elements 118 and the touch sensing layer 116.

As described in greater detail herein, the feedback elements 118 may be configured to provide stimulation to a user's fingertips 119 to guide the user in providing input to the electronic device 102. More specifically, the feedback elements 118 may be configured to provide a tactile sensation corresponding to selection inputs (e.g. 108(1) to 108(n)) provided on the GUI 106 so as to allow the user to distinguish between areas of the touchscreen display 104 corresponding to a selection input and other areas of the display 104 that are devoid of selection inputs.

For example, as shown in FIG. 2A, the feedback elements 118 may include piezo-elements configured to undergo physical movement and/or deformation to provide tactile sensation for the user. The piezo-elements 118 may resemble individual pixels on the touchscreen display 104 and, as such, may provide a very fine texture. The piezo-elements 118 may be programmable such that each piezo-element 118 may be configured to undergo physical transformation in response to the GUI 106 currently being displayed on the touchscreen display 104. Each piezo-element 118 may be configured to transform to provide an overall textured surface resembling the GUI 106 currently displayed on the touchscreen display 104. For example, each piezo-element 118 may contract or expand based on data related to the GUI 106, particularly the location and dimension of selection inputs (e.g. 108(1)-108(n)) provided by the GUI 106.

As described in greater detail herein, the tactile feedback assembly 112 may include a feedback control (shown and described in FIG. 4) configured to communicate and exchange information with the electronic device 102, particularly with circuitry related to the GUI 106 and touchscreen display 104. In particular, the feedback control is configured to control the transformation of the piezo-elements based on data related to the GUI 106. In response to data related to the GUI 106 currently being displayed, the piezo-elements may transform to provide a sense of texture indicating the presence of selection inputs of the GUI 106. For example, a first set of piezo-elements 118(1) may undergo no transformation (remain unchanged in shape), as indicated by arrow 124, and a second set of piezo-elements 118(2) may transform (e.g. increase in height and shape, such as sharp micro-tips), as indicated by arrow 126. The first and second sets of piezo-elements 118(1), 118(2) generally provide a sense of texture to the user and provide indication to the user as to whether they are currently touching a portion of the display 104 containing a selection input or a portion of the display 104 devoid of selection inputs. For example, the first set of piezo-elements 118(1) may provide a smooth texture indicating a location of the GUI 106 that does not contain any selection inputs and the second set of piezo-elements 118(2) may provide a rough texture indicating a location of the GUI 106 that contains a selection input.

In addition to providing a sense of texture, the piezo-elements 118 may also be configured to provide a sense of pressure (e.g. downward motion, such as striking a conventional keyboard) when a user places force upon either the first set of piezo-elements 118(1) or the second set of piezo-elements 118(2). For example, the first set of piezo-elements 118(1) may provide greater resistance against a user's finger and prevent substantial deformation of the surface layer 120, thereby indicating that the location is devoid of selection inputs of the GUI 106. Alternatively, the second set of piezo-elements 118(2) may provide less resistance against a user's finger and allow deformation of the surface layer 120, thereby indicating that the location includes a selection input.

Referring to FIG. 2B, the tactile feedback assembly 112b may be similar to the tactile feedback assembly 112a of FIG. 2A. As such, like numerals represent like parts. The tactile feedback assembly 112b may further include one or more electrical elements 128 configured to provide nerve stimulation to the user, in addition the tactile sensation of texture provided by the piezo-elements 118. In particular, the electrical elements 128 may be programmable to generate a small and controllable amount of electrical current to provide electrical stimulation to a user's fingertip 119 in contact with a particular portion of the surface layer 120. For example, each electrical element 128 may correspond to a single piezo-element 118 and may be programmed to generate current in the event that the associated piezo-element 118 undergoes transformation. In one embodiment, electrical elements 128 associated with the first set of piezo-elements 118(1) (at arrow 124) may not generate an electrical current and electrical elements 128 associated with the second set of piezo-elements 118(2) (at arrow 126) may generate an electrical current. As such, in addition to providing a smooth textured surface via the first set of piezo-elements 118(1), the associated electrical elements 128 do not provide an electrical stimulus to the user's fingertip 119, thereby providing further indication of a lack of selection inputs in that particular location of the touchscreen display 104. Similarly, in addition to providing a rough textured surface via the second set of piezo-elements 118(2), the associated electrical elements 128 are configured to provide an electrical stimulus to the user's finger tip 119, thereby providing further indication of a selection input in that particular location of the touchscreen display 104.

It should be noted that the indications provided by the first set and second set of piezo-elements 118(1), 118(2) may be reversed. For example, the smooth textured surface provided by the first set of piezo-elements 118(1) may indicate the presence of a selection input and the rough textured surface provided by the second set of piezo-elements 118(2) may indicate a lack of presence of a selection input. This may also be the case for the electrical elements 128, wherein a lack of electrical charge may indicate the presence of a selection input and an electrical charge indicates a location devoid of selection inputs.

Referring to FIG. 2C, another embodiment of a tactile feedback assembly 112c is shown. In the illustrated embodiment, the tactile feedback assembly 112c includes one or more electrodes 130 configured to provide tactile sensation to a user, particularly a user's fingertips 119, during user interaction with the touchscreen display 104. The electrodes 130 are configured to provide nerve stimulation to a user's fingertips 119 to guide the user in providing input to the electronic device 102. More specifically, the electrodes 130 may be configured to provide a tactile sense corresponding to selection inputs (e.g. 108(1) to 108(n)) provided on the GUI 106 so as to allow the user to distinguish between areas of the touchscreen display 104 corresponding to a selection input and other areas that do not.

Similar to the piezo-elements 118 of the tactile feedback assembly 112a of FIG. 2A, the electrodes 130 may resemble individual pixels on the touchscreen display 104 and, as such, may provide a very fine texture. The electrodes 130 may be programmable such that each electrode 130 may generate a small and controllable amount of electrical current in response to the GUI 106 currently being displayed on the touchscreen display 104 to provide electrical stimulation to a user's fingertip 119 in contact with a particular portion of the surface layer 120 and touchscreen display 104. For example, each electrode 130 may be configured to generate electrical current based on data related to the GUI 106, particularly the location and dimension of selection inputs (e.g. 108(1)-108(*n*)) provided by the GUI 106.

Similar to the tactile feedback assembly 112*a* of FIG. 2A, the tactile feedback assembly 112*c* may include a feedback control configured to communicate and exchange information with the electronic device 102, particularly with circuitry related to the GUI 106 and touchscreen display 104. In particular, the feedback control is configured to control the electrodes 130 based on data related to the GUI 106. The feedback control may be configured to set any suitable characteristic of the electrical charge received by the user, including, for, example the intensity, change in intensity, frequency, change in frequency, or any other suitable characteristic of the received electrical charge.

In response to data related to the GUI 106 currently being displayed, the electrodes 130 may transform to provide an electrical stimulus indicating the presence of selection inputs of the GUI 106. For example, a first set of electrodes 130(1) may undergo no generation of electrical current, as indicated by arrow 132, and a second set of electrodes 130(2) may generate electrical current, as indicated by arrow 134. The first and second sets of electrodes 130(1), 130(2) generally provide electrical stimulation to the user and provide indication to the user as to whether they are currently touching a portion of the display 104 containing a selection input or a portion of the display 104 devoid of selection inputs. For example, the first set of electrodes 130(1) may provide a surface devoid of electrical stimulation, indicating a location of the GUI 106 that does not contain any selection inputs and the second set of electrodes 130(2) may provide a surface emitting electrical stimulus to a user's fingertip, thereby indicating a location of the GUI 106 that contains a selection input. The electrical stimulation may be controlled in such a way so as to provide a tactile sensation of pressure and/or texture, as generally understood by one skilled in the art.

It should be noted that, in the illustrated embodiments of FIGS. 2A-2C, components of the tactile feedback assembly are preferably transparent so as to allow the user to view the GUI 106 on the touchscreen display 104. Additionally, the surface layer 120 and/or insulating layer 122 may include elastically deformable materials.

Figure 3:
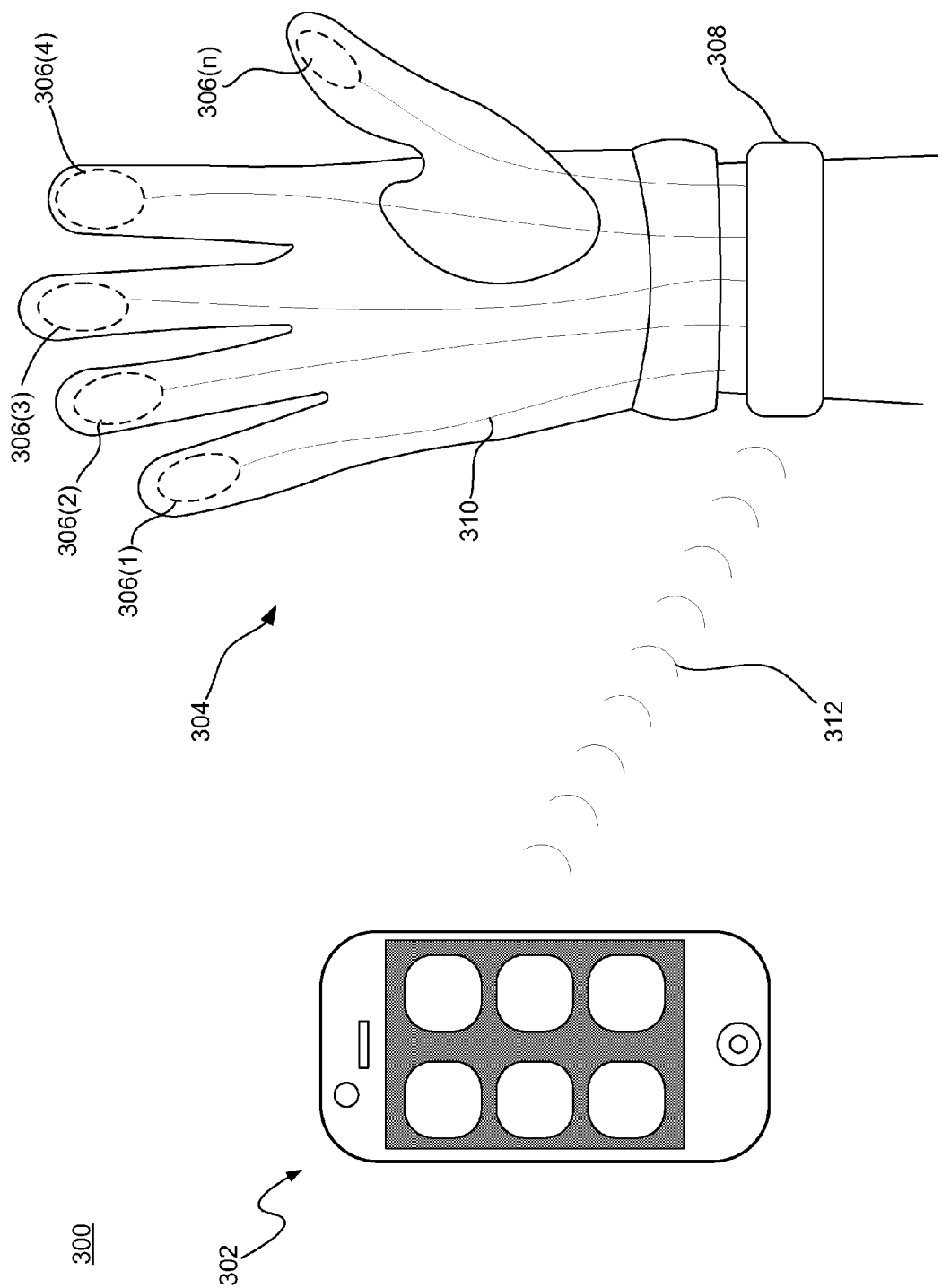
FIG. 3 illustrates a system for providing tactile feedback including an article of clothing equipped with a tactile feedback assembly consistent with various embodiments of the present disclosure.

Turning to FIG. 3, another embodiment of a system 300 consistent with the present disclosure is illustrated. As shown, the system 300 includes an electronic device 302 and an article of clothing, such as, for example, a glove 304 equipped with one or more tactile feedback assemblies 306(1)-306(*n*) consistent with various embodiments of the present disclosure. The electronic device 302 may be similar as the electronic device 102 of FIG. 1. In particular, the electronic device 302 may include a display upon which the user may interact with and control the device 302. It should be noted that the electronic device 302 need not include a touchscreen display in order for a user to interact with the device 302. Instead, the device 302 may include custom, proprietary, known and/or after-developed communication technology configured to allow user may interact with a GUI of the device 302 by way of the tactile feedback assemblies 306(1)-306(*n*) embedded in the glove.

As shown, the glove 304 includes a tactile feedback assembly 306 on each finger, wherein each assembly 306 is configured to communicate with the device 302, particularly a user interface of the device 302, and further provide mechanical and/or nerve stimulation based on user interaction with the device 102. The tactile feedback assemblies 306(1)-306(*n*) are similar to the tactile feedback assemblies previously described herein. In one embodiment, each of the assemblies 306(1)-306(*n*) may be similar to only one of the assemblies 112*a*, 112*b* or 112*c*. In other embodiments, the glove 304 may include a mixture of the tactile feedback assemblies 112*a*-112*c*.

As shown, the glove 304 is separate from the electronic device 302. As such, the tactile feedback assemblies 306(1)-306(*n*) may be configured to wirelessly communicate with the device 302. In particular, each assembly 306 is coupled to a communication module 308 (shown in the form of a bracelet) by way of conductors 310, wherein the communication module 308 is configured to enable wireless communication 312 between the device 302 and tactile feedback assemblies 306. The communication module 308 may be configured to provide wireless communication via a variety of known wireless protocols, including, but not limited to, second generation (2G), third generation (3G), fourth generation (4G) cellular-based data communication, Wi-Fi wireless data communication, etc. It should be noted that, in addition to wireless communication, the communication module 308 may also provide wired communication between the glove 304 and embedded assemblies 306 and the electronic device 302, such that the glove 304 may act as a wired peripheral device. The user may interact with a user interface of the electronic device 302 via the tactile feedback assemblies 306 of the glove 304, wherein the tactile feedback assemblies 306 may be configured to receive signals related to user input and generate mechanical and/or nerve stimulation in response thereto upon one or more surfaces of the user's hand, including their fingers and/or palm.

The system 300 of FIG. 3, particularly the use of an article of clothing, such as a glove 304, for embedding tactile feedback devices consistent with the present disclosure provides some benefits. For example, certain components of the feedback assemblies embedded in the glove 304 need not be transparent due to the fact that the assemblies 306 are separate from the display of the device being controlled, and, as such, the display is not being viewed through the assemblies 306. Additionally, the use of a glove 304 may further allow other types of feedback elements to be used for providing tactile sensation, such as, for example, Micro-Electro-Mechanical System (MEMS) devices (e.g. mechanical actuators) that may provide a wide range of movement.

Another advantage the system 300 of FIG. 3 is that the glove 304 is a separate device and agnostic to the actual electronic device that the glove 304 communicates with. For example, the glove 304 and embedded assemblies 306 may further include circuitry (possibly as part of the communication module 308) configured to track and identify the location of the user and further detect the presence of electronic devices configured to communicate and interact with the assemblies 306. For example, a user wearing the glove 304 may be walking down a street and passes by electronic billboard device (possibly in front of a store window) in which the billboard device is display some goods for sale (e.g. shoes, purses, clothing, etc). The glove 304 may be configured to identify the billboard as a tactile feedback-enabled device, such that the user may wireless interact with the billboard, particularly the goods offered for sale. The tactile feedback assemblies may be configured to receive data from the billboard related to the goods for sale, and, in turn, provide the user with tactile sensation of the goods based on the received data. The tactile sensation may include, for example, the texture of the shoes or purse. This may help the user make a quick decision as to whether to purchase or further examine the item within the store, without having to actually enter the store. Similarly, a television may be a tactile feedback-enabled device, in which the user may be able to interact with subject matter depicted on the display.

Figure 4:
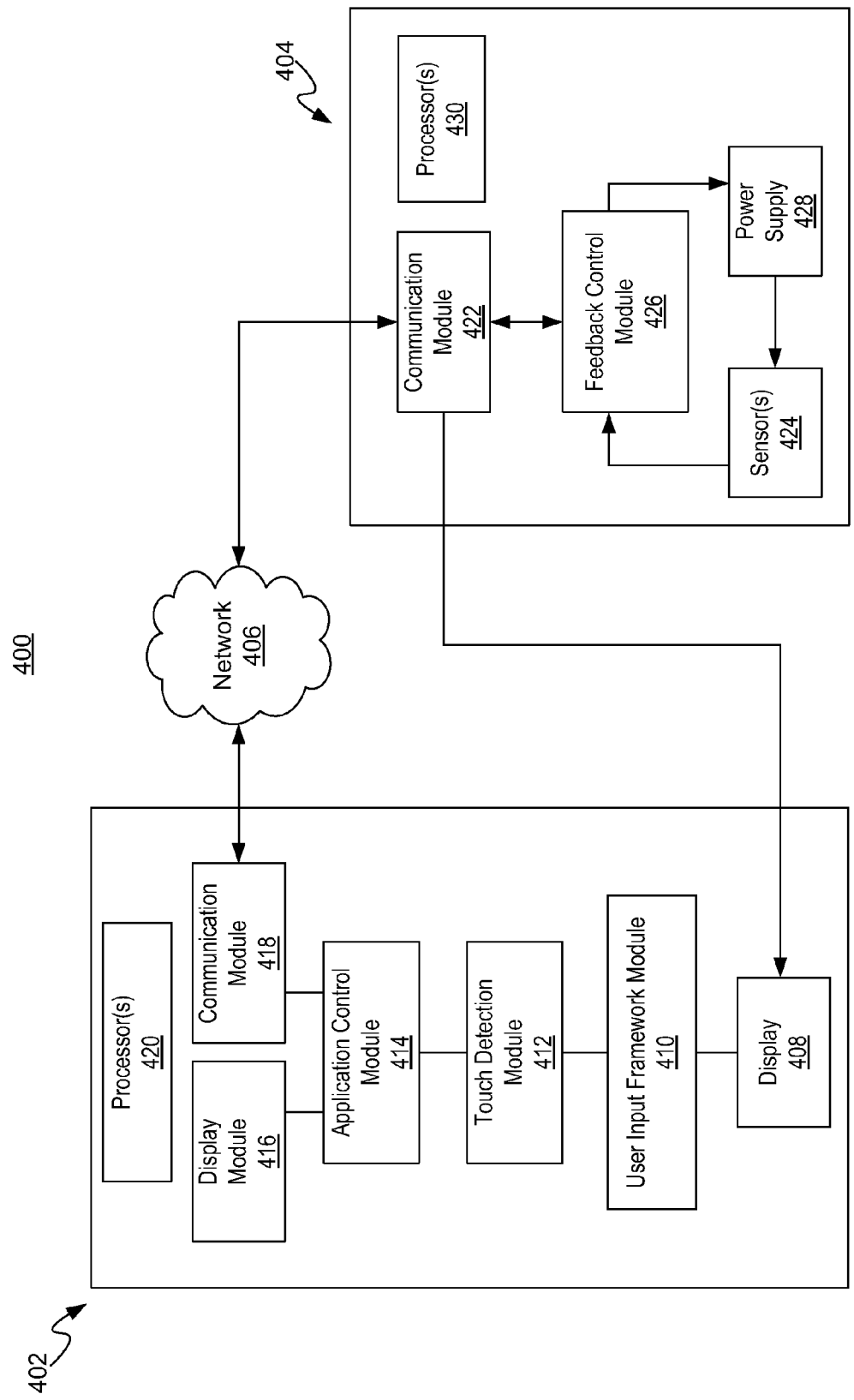
FIG. 4 is a block diagram illustrating one embodiment of a system for providing tactile feedback consistent with various embodiments of the present disclosure.

FIG. 4 is a block diagram illustrating one embodiment of a system 400 for providing tactile feedback consistent with various embodiments of the present disclosure. As shown, the system includes an electronic device 402, such as the electronic device 102, 302 of FIGS. 1 and 3. The system 400 further includes a tactile feedback assembly 404, such as the tactile feedback assemblies (e.g. 112a-112c) previously described herein.

It should be appreciated that the device 402 shown in FIG. 4 is one example of a device consistent with the present disclosure. As such, a device consistent with the present disclosure may have more or fewer components than shown, may combine two or more components, or a may have a different configuration or arrangement of the components. The various components shown in FIG. 4 may be implemented in hardware, software or a combination of hardware and software, including one or more signal processing and/or application specific integrated circuits.

As shown, the electronic device 402 and tactile feedback assembly 404 are configured for wired/wireless communication with one another. For example, the electronic device 402 and tactile feedback assembly 404 may be configured to communicate with one another over a network 406. The network 406 may be any network that carries data. Non-limiting examples of suitable networks that may be used as network 406 include the internet, private networks, virtual private networks (VPN), public switch telephone networks (PSTN), integrated services digital networks (ISDN), digital subscriber link networks (DSL), wireless data networks (e.g., cellular phone networks), other networks capable of carrying data, and combinations thereof. In some embodiments, network 406 is chosen from the internet, at least one wireless network, at least one cellular telephone network, and combinations thereof. Additionally, as shown and described in FIGS. 1 and 2A-2C, the electronic device 402 and tactile feedback assembly 404 may be configured to communicate via any known wired communication means.

As shown, the device 402 may include a display 408. The display 408 may include any device configured to display text, still images, moving images (e.g., video), user interfaces, graphics, etc. The display 408 may be integrated within the device 402 or may interact with the device 402 via wired or wireless communication. As generally understood, the display 408 may be a touch-sensitive display configured to allow a user to control (i.e. navigate) a GUI of the device 402 presented on the display 408. As shown, touchscreen display 408 may provide input to a user input framework module 410. The user input framework module 410 may include custom, proprietary, known and/or after-developed user input code (or instruction sets) that are generally well-defined and operable to control the touchscreen display 408. For example, the user input framework module 410 may cause the touchscreen display 408 to record touches and may process touches. The user input framework module 410 may vary depending on device 402, and more particularly, the operating system (OS) running in device 402. Example operating systems include iOS®, Android®, Blackberry® OS, Symbian®, Palm® OS, etc.

The device 402 further includes a touch detection module 412 configured to receive touch data from the user input framework module 410 and to identify the touch event based on the received touch data and generate touch input data. The touch event identifier may include touch type and/or touch location(s) of the touchscreen display 408. Touch type may include a single tap, a double tap, a tap and hold, a tap and move, a pinch and stretch, a swipe, etc., to the display 108. The touch detection module 414 may include custom, proprietary, known and/or after-developed touch detection code (or instruction sets) that are generally well-defined and operable to receive touch data and to identify a touch event.

The device 402 further includes an application control module 414 configured to allow a user of device 402 to interact with applications on the device 402. More specifically, the application control module 414 may include an interface configured to allow a user to control one or more parameters of a running application via selection inputs (such as selection inputs 108(1)-108(n) of the GUI 106 shown in FIG. 1). More specifically, the display module 416 may be configured to display the user interface of one or more application on the display 408. The application control module 414 is configured to receive user input to allow the user to navigate and select one or more options. For example, the application control module 414 may be configured to receive touch input data from the touch detection module 412.

The device 402 further includes a communication module 418 configured to transmit and receive information between the device 402 and tactile feedback assembly 404. The communication module 418 may include custom, proprietary, known and/or after-developed communication processing code (or instruction sets) that are generally well-defined and operable to transmit and receive data, including data related to the user interface for any given application running on the device 402, as well as input data captured by one or more feedback elements 424 of the tactile feedback assembly 404, described in greater detail herein. The communication module 314 transmits and receives the above information via network 406 as previously described. The device 402 may further include one or more processor(s) 420 configured to perform operations associated with device 402 and one or more of the modules included therein.

As shown, the tactile feedback assembly 404 includes one or more feedback elements 424 configured to provide tactile sensation to a user during user interaction with the device 402. In one embodiment, the one or more feedback elements 424 may directly contact the display 408, and, as such, the feedback elements may provide tactile sensation as the user interacts with the touchscreen display 408, thereby guiding the user in providing input to the electronic device 402. More specifically, the feedback elements 424 may be configured to provide a tactile sensation corresponding to selection inputs provided on the user interface of the display 408 so as to allow the user to distinguish between areas of the touchscreen display 408 corresponding to a selection input and other areas of the display 408 that are devoid of selection inputs.

The tactile feedback assembly 404 further includes a feedback control module 426 configured to receive data related to the user interface of an application running on the device 402 and control the feedback elements 424 to provide tactile sensation to the user based on the data related to the user interface. In embodiments in which the feedback elements 424 are directly contacting the display 408, the feedback elements 424 may further be configured to transmit a user's touch to touch sensing technology of the touchscreen display 408. The feedback control module 426 may rely on a power supply 428 to control feedback elements 424 to provide tactile sensation to the user. For example, as previously described, the feedback elements 424 may include piezo-elements and/or electrodes, as shown in FIGS. 2A-2C. The feedback control module 426 may be configured to apply current from a power supply to the feedback elements 424 to achieve a desired effect. For example, the feedback control module 426 may be configured to control current applied to the feedback elements 424 such that a specific tactile sensation is achieved, such as, for example synthetically producing sensations (e.g. hard, soft, smooth, rough, etc.) with the use of electrical stimulus provided by the feedback elements 424. The tactile feedback assembly 404 may further include one or more processor(s) 430 configured to perform operations associated with tactile feedback assembly 404 and one or more of the modules included therein.

Figure 5:
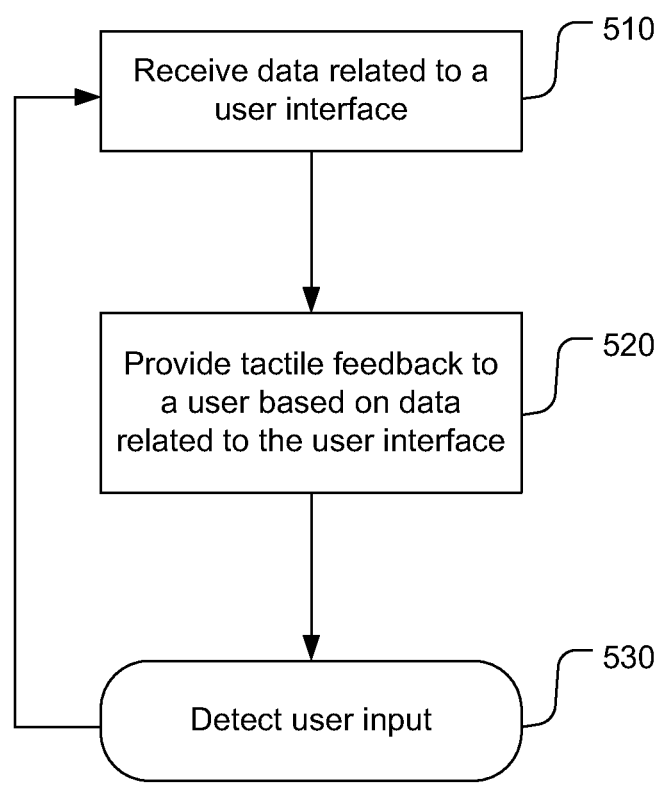
FIG. 5 is a flow diagram illustrating one embodiment for providing tactile feedback consistent with the present disclosure.

Turning now to FIG. 5, a flowchart of one embodiment of a method 500 for providing tactile feedback consistent with the present disclosure is illustrated. The method 500 includes receiving data related to a user interface (operation 510). The user interface may include a graphical user interface (GUI) related to an application running on a device having a touchscreen display. The method 500 further includes providing tactile feedback to a user based on the data related to the user interface (operation 520). The tactile feedback may include mechanical and/or nerve stimulation on the touchscreen display configured to provide a user with tactile sensation (in the form of the sense of touch) to guide the user during interaction with the user interface. The method 500 further includes detecting user input (operation 530) and further repeating the process at operation 510. For example, the user may interact with the user interface, utilizing the tactile feedback as a guide for inputting data for controlling operations and/or parameters of a running application via the user interface. Upon inputting data, the process may then repeat, accounting for any changes in the user interface based on the user input.

While FIG. 5 illustrates method operations according various embodiments, it is to be understood that in any embodiment not all of these operations are necessary. Indeed, it is fully contemplated herein that in other embodiments of the present disclosure, the operations depicted in FIG. 6 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect of the present disclosure, there is provided a tactile feedback assembly for providing tactile feedback in a user interface. The assembly includes a feedback control module configured to receive data related to a user interface of a device and generate at least one feedback signal based on the data and one or more feedback elements configured to provide tactile sensation to a user during user interaction with the user interface based on the at least one feedback signal from the feedback control module.

Another example assembly includes the foregoing components and the user interface is presented on a display coupled to the device and allows the user to control one or more operations of the device by way of one or more selection inputs.

Another example assembly includes the foregoing components and the tactile sensation provided by the one or more feedback elements includes at least one of mechanical stimulation and nerve stimulation provided to the user during user interaction with the user interface presented on the display.

Another example assembly includes the foregoing components and the tactile sensation provides the user with an indication of the presence of the one or more selection inputs of the user interface.

Another example assembly includes the foregoing components and the tactile sensation provided by the one or more feedback elements is selected from the group consisting of a sense of pressure and a sense of texture.

Another example assembly includes the foregoing components and the display is a touchscreen display configured to receive user input and the one or more feedback elements are integrated with the touchscreen display.

Another example assembly includes the foregoing components and the one or more feedback elements include at least one of piezo-elements and electrodes.

Another example assembly includes the foregoing components and the feedback control module is configured to control transformation of each of the piezo-elements based on the data related to the user interface.

Another example assembly includes the foregoing components and the transformation of the piezo-elements includes at least one of change in shape and change in size.

Another example assembly includes the foregoing components and the feedback control module is configured to control electrical stimulus provided by the one or more electrodes based on the data related to the user interface.

According to another aspect of the present disclosure, there is provided a system for providing tactile feedback in a user interface of a device. The system includes a device having a user interface presented on a display, wherein the user interface allows a user to interact with and control one or more operations of the device by way of one or more selection inputs and a tactile feedback assembly configured to provide tactile feedback to the user based on the user interface of the device. The tactile feedback assembly includes a feedback control module configured to receive data related to the user interface and generate at least one feedback signal based on the data and one or more feedback elements configured to provide tactile sensation to the user during user interaction with the user interface based on the at least one feedback signal from the feedback control module.

Another example system includes the foregoing components and the tactile sensation provided by the one or more feedback elements includes at least one of mechanical stimulation and nerve stimulation provided to the user during user interaction with the user interface, wherein the tactile sensation provides the user with an indication of the presence of the one or more selection inputs of the user interface.

Another example system includes the foregoing components and the tactile sensation provided by the one or more feedback elements is selected from the group consisting of a sense of pressure and a sense of texture.

Another example system includes the foregoing components and the one or more feedback elements include at least one of piezo-elements and electrodes.

Another example system includes the foregoing components and the feedback control module is configured to control transformation of each of the piezo-elements based on the data related to the user interface, wherein the transformation of the piezo-elements includes at least one of change in shape and change in size.

Another example system includes the foregoing components and the feedback control module is configured to control electrical stimulus provided by the one or more electrodes based on the data related to the user interface.

Another example system includes the foregoing components and further includes an article of clothing in which the tactile feedback assembly is integrated.

Another example system includes the foregoing components and the display is a touchscreen display configured to receive user input and the tactile feedback assembly is physically integrated with the touchscreen display.

According to another aspect, there is provided at least one computer accessible medium including instructions stored thereon. When executed by one or more processors, the instructions may cause a computer system to perform operations for providing tactile feedback in a user interface. The operations include receiving data related to a user interface of a device, generating a feedback signal based on the data related to the user interface and providing one or more tactile sensations to a user interacting with the user interface based on the feedback signal.

Another example computer accessible medium includes the foregoing operations and the providing one or more tactile sensations includes applying a mechanical stimulation to the user during user interaction with the user interface.

Another example computer accessible medium includes the foregoing operations and the mechanical stimulation provides at least one of a sense of pressure and sense of texture.

Another example computer accessible medium includes the foregoing operations and the providing one or more tactile sensations includes applying an electrical stimulation to the user during user interaction with the user interface.

Another example computer accessible medium includes the foregoing operations and further includes controlling electrical stimulation so as to provide at least one of a sense of pressure and sense of texture.

According to another aspect of the present disclosure, there is provided a method for providing tactile feedback in a user interface. The method includes receiving, by a feedback control module, data related to a user interface of a device, generating, by the feedback control module, a feedback signal based on the data related to the user interface and providing, by one or more feedback elements, one or more tactile sensations to a user interacting with the user interface based on the feedback signal from the feedback control module.

Another example method includes the foregoing operations and the user interface is presented on a display coupled to the device and allows the user to control one or more operations of the device by way of one or more selection inputs.

Another example method includes the foregoing operations and the tactile sensation provided by the one or more feedback elements includes at least one of mechanical stimulation and nerve stimulation provided to the user during user interaction with the user interface.

Another example method includes the foregoing operations and the tactile sensation provides the user with an indication of the presence of the one or more selection inputs of the user interface.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present disclosure should not be limited by any of the above-described exemplary embodiments, but should be defined only in accordance with the following claims and their equivalents.

What is claimed is:

1. A tactile feedback assembly comprising:
a glove for a hand, said glove having at least one finger including at least one actuation region;
a communication system to:
  detect a presence of a display system having a display, a user interface, and a transmitter;
  determine whether said display system can wirelessly transmit tactile data using said transmitter; and
  receive said tactile data from said display system;
a feedback control system to generate at least one feedback signal based on said tactile data received from said display system in response to said at least one actuation region being located proximate to an input region of said display system; and
one or more feedback actuators within said at least one actuation region to receive said at least one feedback signal and, based on said at least one feedback signal, provide a tactile sensation of texture or vertical displacement to a user in response to said at least one actuation region being located proximate to said input region of said display.

2. The tactile feedback assembly of claim 1, wherein said user interface is presented on said display and allows said user to control one or more operations of said display system by way of selection of said input region of said display.

3. The tactile feedback assembly of claim 2, wherein said tactile sensation provided by said one or more feedback actuators includes at least one of mechanical stimulation and nerve stimulation provided to said user during user interaction with said user interface presented on said display.

4. The tactile feedback assembly of claim 3, wherein said tactile sensation provides said user with an indication of the presence of said one input region of said user interface.

5. The tactile feedback assembly of claim 1, wherein said one or more feedback actuators include at least one of piezo-elements and electrodes.

6. The tactile feedback assembly of claim 5, wherein said feedback control system is to control transformation of each of said piezo-elements based on said tactile data related to said user interface.

7. The tactile feedback assembly of claim 6, wherein said transformation of said piezo-elements includes at least one of change in shape and change in size.

8. The tactile feedback assembly of claim 5, wherein the feedback control system is to control electrical stimulus provided by said one or more electrodes based on said tactile data related to said user interface.

9. A system for providing tactile feedback in a user interface of a device, said system comprising:
a display system having a user interface, a display, and a transmitter wherein said user interface allows a user to interact with and control one or more operations of said display system by way of one or more selection inputs;
a glove for a hand, said glove having at least one finger including at least one actuation region; and
a tactile feedback assembly to provide tactile feedback to said user based on a proximity of said actuation region to an input region of said display system, said tactile feedback assembly comprising:
  a communication system to:
    detect a presence of said display system;
    determine whether said display system can wirelessly transmit tactile data using said transmitter; and
    receive said tactile data from said display system;
  a feedback control system to generate at least one feedback signal based on said tactile data received from said display system in response to said at least one actuation region being located proximate to an input region of said display system; and
  one or more feedback actuators within said at least one actuation region to receive said at least one feedback signal and, based on said at least one feedback signal, provide a tactile sensation of texture or vertical displacement to said user in response to said at least one actuation region being located proximate to said input region of said display.

10. The system of claim 9, wherein said tactile sensation provided by said one or more feedback actuators includes at least one of mechanical stimulation and nerve stimulation provided to said user during user interaction with said user interface, wherein said tactile sensation provides said user with an indication of the presence of said input region of said user interface.

11. The system of claim 9, wherein said one or more feedback actuators include at least one of piezo-elements and electrodes.

12. The system of claim 11, wherein said feedback control system is to control transformation of each of said piezo-elements based on said tactile data related to said user interface, wherein said transformation of said piezo-elements includes at least one of change in shape and change in size.

13. The system of claim 12, wherein said feedback control system is to control electrical stimulus provided by said one or more electrodes based on said data related to said user interface.

14. A computer system comprising one or more non-transitory computer readable memories which store, in combination or singularly, instructions that, when executed by a one or more computers, cause the one or more computers to perform operations for providing tactile feedback in a user interface, said operations comprising:
detecting a presence of a display system having a display, a user interface, and a transmitter;
determining whether said display system can wirelessly transmit tactile data using said transmitter;
receiving said tactile data from said display system;
generating a feedback signal based on said tactile data received from said display system in response to an actuation region of a glove being located proximate to an input region of said display system, said feedback signal to cause at said actuation region of said glove to provide one or more tactile sensations of texture or vertical displacement to a user in response to said actuation region being located proximate to said input region.

15. The computer system of claim 14, wherein said feedback signal is to cause a mechanical stimulation to be applied to said user during user interaction with said user interface.

16. The computer system claim 14, wherein said feedback signal is to cause an electrical stimulation to be applied to said user during user interaction with said user interface.

17. A method for providing tactile feedback in a user interface, said method comprising:
detecting a presence of a display system having a display, a user interface, and a transmitter;
determining whether said display system can wirelessly transmit tactile data using said transmitter;
receiving, by a feedback control system, said tactile data from said display system;
generating, by said feedback control system, a feedback signal based on said tactile data received from said display system in response to an actuation region of a glove being located proximate to an input region of said display system; and providing, by one or more feedback actuators in said actuation region of said glove, one or more tactile sensations of texture or vertical displacement to a user in response to said actuation region being proximate to said input region of said display.

18. The method of claim 17, wherein said user interface is presented on said display and allows said user to control one or more operations of said device by way of said input region of said display.

19. The method of claim 18, wherein said tactile sensation provided by said one or more feedback actuators includes at least one of mechanical stimulation and nerve stimulation provided to said user during user interaction with said input region of said user interface.

20. The method of claim 18, wherein said tactile sensation provides said user with an indication of the presence of said input region of said user interface.

* * * * *